(12) United States Patent
Chatterjee et al.

(10) Patent No.: US 10,710,904 B2
(45) Date of Patent: Jul. 14, 2020

(54) DEVICE AND A PROCESS FOR PURIFICATION OF GREY WATER

(71) Applicant: Conopco, Inc., Englewood Cliffs, NJ (US)

(72) Inventors: Jaideep Chatterjee, Bangalore (IN); Shajahan Abdul Kareem, Bangalore (IN); Santosh Kumar Gupta, Bangalore (IN); Shailendra Pratap, Bangalore (IN); Rajeesh Kumar Ramachandran, Bangalore (IN)

(73) Assignee: CONOPCO, INC., Englewood Cliffs, NJ (US)

( * ) Notice: Subject to any disclaimer, the term of this patent is extended or adjusted under 35 U.S.C. 154(b) by 1140 days.

(21) Appl. No.: 15/026,616

(22) PCT Filed: Sep. 30, 2014

(86) PCT No.: PCT/EP2014/070846
§ 371 (c)(1),
(2) Date: Apr. 1, 2016

(87) PCT Pub. No.: WO2015/052036
PCT Pub. Date: Apr. 16, 2015

(65) Prior Publication Data
US 2016/0244340 A1    Aug. 25, 2016

(30) Foreign Application Priority Data
Oct. 8, 2013    (EP) .................................... 13187691

(51) Int. Cl.
*C02F 1/24*    (2006.01)
*B01D 19/02*    (2006.01)
(Continued)

(52) U.S. Cl.
CPC ............ *C02F 1/24* (2013.01); *B01D 19/0052* (2013.01); *B01D 19/02* (2013.01); *B03D 1/082* (2013.01);
(Continued)

(58) Field of Classification Search
CPC ...... C02F 1/24; C02F 1/001; C02F 2101/301; C02F 2103/002; C02F 2303/26
(Continued)

(56) References Cited

U.S. PATENT DOCUMENTS 1,376,073 A * 4/1921 Borcherdt ................ B03D 1/08
96/177
3,434,968 A    3/1969 Lowe
(Continued)

FOREIGN PATENT DOCUMENTS

CN    203700074    7/2014
EP    1953119      8/2008
(Continued)

OTHER PUBLICATIONS

Andou et al., "Performance Characteristics of Mechanical Foam-Breakers with Rotating Parts Fitted to Bubble Column", Journal of Chemical Technology & Biotechnology, Jan. 1, 1997, vol. 68, No. 1, pp. 94-100, XP000686506. pp. 1 to 7.
(Continued)

*Primary Examiner* — Thomas M Lithgow
(74) *Attorney, Agent, or Firm* — Foley & Lardner LLP

(57) ABSTRACT

The present invention relates to a device and a process for purification of grey water. In particular the invention relates to in-home purification of grey water generated from laundry wash and/or rinse liquor for water saving by re-use. Surprisingly it has been found that it is possible to design a device and a process where, by continuous aeration, foam breaking and separation, the laundry wash and rinse water
(Continued)

can be made substantially free of surfactants. This water is then preferably filtered to recover fresh water which can be reused for multiple applications.

20 Claims, 3 Drawing Sheets

(51) Int. Cl.
*B03D 1/14* (2006.01)
*B03D 1/08* (2006.01)
*B03D 1/24* (2006.01)
*B01D 19/00* (2006.01)
*C02F 1/00* (2006.01)
*C02F 101/30* (2006.01)
*C02F 103/00* (2006.01)
*C02F 1/28* (2006.01)
*C02F 1/34* (2006.01)

(52) U.S. Cl.
CPC ............. *B03D 1/1462* (2013.01); *B03D 1/24* (2013.01); *C02F 1/001* (2013.01); *C02F 1/283* (2013.01); *C02F 1/34* (2013.01); *C02F 2101/301* (2013.01); *C02F 2103/002* (2013.01); *C02F 2303/26* (2013.01)

(58) Field of Classification Search
USPC ............................ 210/703–707, 221.1–221.2
See application file for complete search history.

(56) References Cited

U.S. PATENT DOCUMENTS

| 4,233,152 A * | 11/1980 | Hill .......................... C02F 1/24 |
| | | 210/221.2 |
| 4,657,677 A | 4/1987 | Roubicek |
| 7,101,478 B2 * | 9/2006 | Corradi .............. B01D 19/0057 |
| | | 210/170.09 |
| 2006/0091054 A1 * | 5/2006 | Hotani ................... B01D 19/02 |
| | | 210/221.1 |
| 2012/0208901 A1 | 8/2012 | Takenouchi |

FOREIGN PATENT DOCUMENTS

| JP | 51123959 | 10/1975 |
| JP | 51136356 | 11/1976 |
| JP | 06226248 | 8/1994 |
| JP | 2000093944 | 4/2000 |
| RU | 494353 | 12/1975 |
| RU | 701957 | 12/1979 |
| WO | WO0200557 | 1/2002 |
| WO | WO2007025345 | 3/2007 |
| WO | WO2011052496 | 5/2011 |
| WO | WO2011160185 | 12/2011 |
| WO | WO2012084621 | 6/2012 |
| WO | WO2013072476 | 5/2013 |

OTHER PUBLICATIONS

IPRP2 in PCTEP2014070846 dated Dec. 22, 2015. pp. 8 to 26.
Search Report and Witten Opinion in PCTEP2014070846 dated Oct. 31, 2014. pp. 33 to 54.
Search Report and Written Opinion in EP13187691 dated Feb. 25, 2014. pp. 55 to 62.

* cited by examiner

DEVICE AND A PROCESS FOR PURIFICATION OF GREY WATER

FIELD OF THE INVENTION

The present invention relates to a device and a process for purification of grey water. In particular the invention relates to in-home purification of grey water generated from laundry wash and/or rinse liquor for water saving by re-use.

BACKGROUND OF THE INVENTION

Any discussion of the prior art throughout the specification should in no way be considered as an admission that such prior art is widely known or forms part of the common general knowledge in the field.

In several geographies water shortage is becoming a more and more acute problem and this is particularly true in developing countries.

Household cleaning processes like washing laundry, dishes etc, require large amounts of water. It will be a great benefit to the society if it will be possible to save this water and also reuse the water used in such activities. The water generated in-home from washing and rinsing laundry is generally referred to as grey water. In order to reuse such household grey water for various activities it is essential to remove all the particulate matter and the surfactants.

Several water purification processes using chemicals such as flocculants and coagulants especially for making water safe for drinking are known in the art. There are also several techniques to purify industrial waste water. Most of these methods involve use of chemicals like aluminium salts and polymers which have an adverse effect on the environment.

WO2002000557 (P&G) describes a water purification composition comprising essentially a primary coagulant, a bridging flocculent, a coagulant aid and optionally a disinfectant. This patent application also claims a method for clarifying and purifying water, which comprises several stages selected from coagulation and flocculation, disinfection, filtration, neutralisation and fortification.

EP1953119 (Unilever) describes solid water purification composition in the form of a two-component system, with a first component comprising a biocide and a water-insoluble adsorbent, and a second component comprising a coagulating agent and a flocculating agent. A biocide quencher may be included in the composition.

WO2012084621 (Unilever), discloses a fast water purification and clarification process for the treatment of household water, especially laundry wash and more typically laundry rinse water by using a composition comprising flocculant, coagulant, filler and cationic surfactant, effective for water clarification and purification.

A device and a process for purification of grey water, especially grey water generated in household processes such as laundry wash and rinse water without the addition of chemicals is highly desired and is beneficial to the environment. The present inventors have been able to develop a device and physical process for purification of grey water especially for in-home purification, which process does not require the addition of chemicals like aluminium salts and polymers that have an adverse effect on the environment.

Goldberg and Rubin (I & EC Process Design and Development, 1967, Vol 6) disclose process of mechanical foam breaking by the shearing action of a high speed rotating disc. However it only discloses foam flow rates upto 200 ml/min by using a smooth disc rotating at a speed of about 2500 rpm. The surfactant used in the process was Triton X-100 which is not a very high foaming surfactant and at relatively low concentrations. They also had a limitation on the disc speed because as the disc speed was increased larger amount of liquid was carried with the foam. This will result in poor recovery of purified water. It does not disclose how the remove foam from the grey water by only channelling the foam while substantially preventing the liquid from getting channelled, which will help in collecting most of the grey water as purified water.

Andou S et al., (Performance characteristics of mechanical foam breakers with rotating parts fitted to bubble column, J. of chem. tech. and biotech, vol 68, no. 1, 1 January, 1997, pg 94-100), compares mechanical foam breakers shaped like fans with vanes/blades oriented perpendicular to the plane rotation with the "blades" in various orientations. These foam breakers, not only consume more power, but also cause a fine mist of droplets in the exhaust air and the liquid phase of the foam gets scattered into a mist which is carried with the air-flow stream leaving the foam breaker. Thus the recovery and collection of pure water from grey water is low.

The present inventors have been able to develop a device and a process to purify grey water which is generated from laundry wash and/or rinse liquor that has high foaming surfactants at relatively high concentrations. Efficient purification of grey water has been achieved by generating and breaking foam using flow rates of 20,000-50,000 mL/min ensuring that the foam is sufficiently dry when it reaches the foam breaking device having a rotating disc whose surface has a patterned roughness.

Surprisingly in the present invention it was found that it is possible to design a device and a process where, by continuous aeration, more than 90% of the surfactant present in used laundry water can be transferred into foam. If the foam is then allowed to channel out from the chamber holding the grey water, and made to collapse outside the chamber, a device and process can be built to remove dissolved surfactants from water. It is thus possible to recover more than 90% of grey water as purified water even when the surfactant level in the grey water is as high as 0.1%. The recovered purified water preferably can be subsequently passed through at least one filter to get further purified water. The key step in achieving the above is the ability to cause foam collapse at very high volumetric flow rate of the foam. It is an object of the invention to provide a device for purification of grey water.

It is another object of the present invention to provide a device for purification of grey water generated in household process, especially laundry wash and rinse processes without the addition of chemicals that have an adverse effect on the environment.

It is another object of the present invention where the surfactant level of the grey water is reduced to less than 1 ppm.

It is another object of the invention to provide a simple physical process for purification of grey water where more than 90% recovery of purified water can be achieved.

SUMMARY OF THE INVENTION i. According to one aspect of the present invention there is provided a device for purification of grey water comprising an air tight container (1) for holding grey water comprising an outlet port (2) for discharging out foam;

ii. the container (1) comprising a means for aeration (3a) of contents of the container (1);

iii. a foam conveyor (4) connected to the outlet port (2);

iv. a foam breaking device comprising:
wherein the outlet port (2) is in fluid communication with a foam breaking device (5) placed external to the container (1); and
wherein the foam breaking device (5) comprises:
a. an inverted cup (6) with open mouth of the cup (7) positioned in a collection tray (8);
b. a disc (9) connected to a motor (14) to facilitate rotation of the disc (9) and placed in the cup (6) and rotatably connected to base of the cup (6);
wherein the foam conveyor (4) establishes fluid communication between the outlet port (2) and the disc (9) of the foam breaking device (5) and wherein the surface of the disc is rough.

According to another aspect of the present invention there is provided a device for purification of grey water comprising:
i. an air tight container (1) for holding grey water comprising an outlet port (2) for discharging out foam;
ii. the container (1) comprising a means for aeration (3a) of contents of the container (1);
iii. a foam conveyor (4) connected to the outlet port (2);
iv. a foam breaking device (5)
wherein the outlet port (2) is in fluid communication with a foam breaking device (5) and
wherein the foam breaking device (5) comprises:
a. an inverted cup (6) positioned over a collection tray (8) wherein the cup is fixed to the collection tray and is provided with an air vent (7);
b. a disc (9) connected to a motor (14) to facilitate rotation of the disc (9) and placed above the collection tray and rotatably connected to the lid of the collection tray;
wherein the foam conveyor (4) establishes fluid communication between the outlet port (2) and the disc (9) of the foam breaking device (5) and wherein the surface of the disc is rough.

It is preferred that the rotation speed of the disc is in the range of 1000 rpm to 10000 rpm.

According to yet another aspect of the present invention there is provided a process for purification of grey water using a device according to the invention comprising:
i. sparging air at a flow rate of 1-200 L/min into the grey water to be purified contained in the airtight container;
ii. providing residence time of at least half a minute;
iii. channelling foam generated from the container onto rotating disc of the foam breaking device; and
iv. stopping the sparging of air after a time period of at least 1 minute to obtain purified water.

It is preferred that ratio of grey water to air in the container is at least 1:3.

In the above process it is preferable to pass the purified water through at least one filter (13).

The features and advantages of the invention will become apparent to those of ordinary skill in the art from a reading of the following detailed description and the appended claims. For the avoidance of doubt, any feature of one aspect of the present invention may be utilized in any other aspect of the invention. The word "comprising" is intended to mean "including" but not necessarily "consisting of" or "composed of." In other words, the listed steps or options need not be exhaustive. It is noted that the examples, embodiment and figures given in the description below are intended to clarify the invention and are not intended to limit the invention to those examples per se.

DETAILED DESCRIPTION OF THE INVENTION

The present invention relates to a device and a process for in-home purification of grey water which enables aeration of grey water for generating foam and physical breaking of the foam thus eliminating the surfactants present therein. In particular the invention relates to in-home purification of grey water generated from laundry wash and/or rinse liquor for water saving by re-use. The present invention thus provides a device and process of in-home purification of grey water by removal of surfactants without the use of any chemicals.

According to one aspect of the present invention there is provided a device for in-home purification of grey water comprising:
i. an air tight container (1) for holding grey water comprising an outlet port (2) for discharging out foam;
ii. the container (1) comprising a means for aeration (3a) of contents of the container (1);
iii. a foam conveyor (4) connected to the outlet port (2);
iv. a foam breaking device comprising:
wherein the outlet port (2) is in fluid communication with a foam breaking device (5) placed external to the container (1); and
wherein the foam breaking device (5) comprises:
a. an inverted cup (6) with open mouth of the cup (7) positioned in a collection tray (8);
b. a disc (9) connected to a motor (14) to facilitate rotation of the disc (9) and placed in the cup (6) and rotatably connected to base of the cup (6);
wherein the foam conveyor (4) establishes fluid communication between the outlet port (2) and the disc (9) of the foam breaking device (5) and wherein the surface of the disc is rough.

According to another aspect of the present invention there is provided a device for purification of grey water comprising:
i. an air tight container (1) for holding grey water comprising an outlet port (2) for discharging out foam;
ii. the container (1) comprising a means for aeration (3a) of contents of the container (1);
iii. a foam conveyor (4) connected to the outlet port (2);
iv. a foam breaking device (5)
wherein the outlet port (2) is in fluid communication with a foam breaking device (5) and
wherein the foam breaking device (5) comprises:
a. an inverted cup (6) positioned over a collection tray (8) wherein the cup is fixed to the collection tray and is provided with an air vent (7);
b. a disc (9) connected to a motor (14) to facilitate rotation of the disc (9) and placed above the collection tray and rotatably connected to the lid of the collection tray;
wherein the foam conveyor (4) establishes fluid communication between the outlet port (2) and the disc (9) of the foam breaking device (5) and wherein the surface of the disc is rough.

It is preferred that the rotation speed of the disc is in the range 1000 rpm to 10000 rpm.

For a more complete understanding of the above and other features and advantages of the invention, reference should be made to the following detailed description of preferred embodiments.

The invention will now be exemplified with the following non-limiting figures.

DETAILED DESCRIPTION OF THE DRAWINGS

Figure 1:
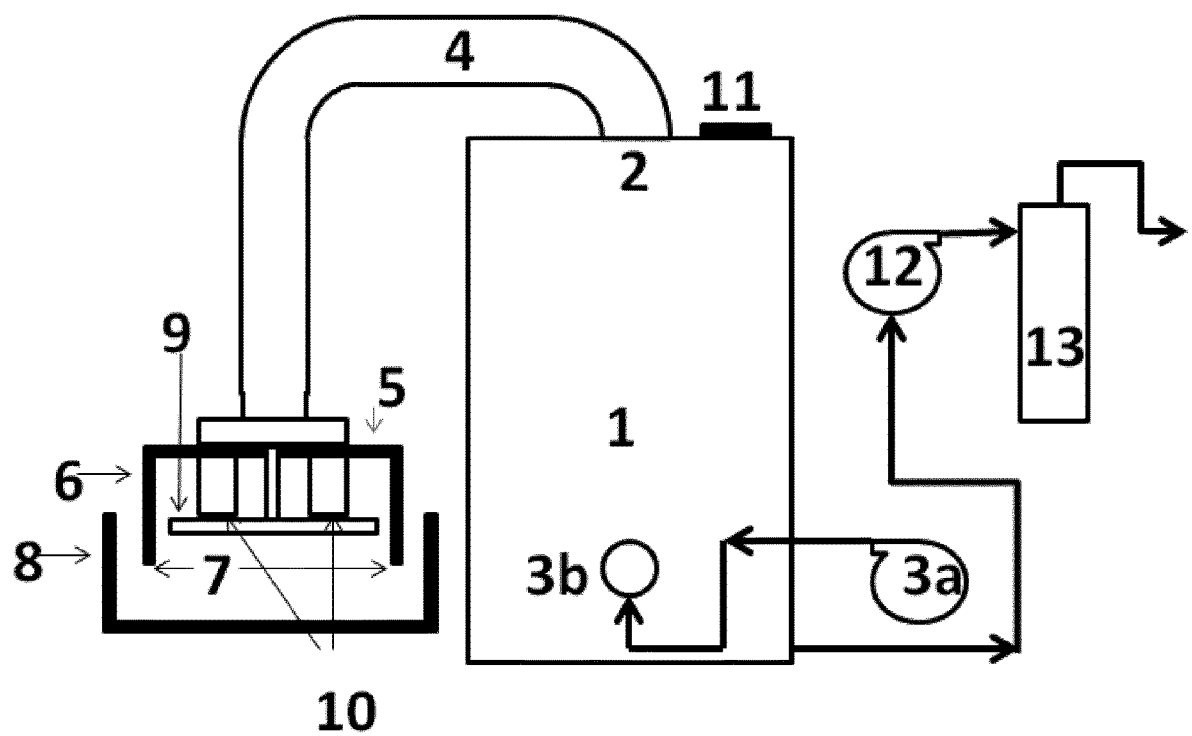
FIG. 1 is a perspective view of an embodiment of the device for in-home purification of grey water in accordance with the invention.

FIG. 1 is a perspective view of an embodiment of the device for in-home purification of grey water comprising an air tight container (1) for holding grey water having an outlet port (2) positioned at the top of the container (1) for discharging out foam. The container (1) has a means for aeration (3a) of the contents of the container (1) to which is attached a sparger (3b), which is capable of sparging air at a flow rate of 1-200 L/min into the grey water contained in the container (1).

The outlet port (2) of the container (1) is connected to a foam conveyor (4) which is in fluid communication with a foam breaking device (5) placed external to the container (1). The foam breaking device (5) which has an inverted cup (6) with open mouth of the cup (7) positioned over a collection tray (8). A disc (9) is connected to a motor (14) to facilitate rotation of the disc (9) at preferably a speed of 1000 rpm to 10000 rpm, is placed in the cup and is rotatably connected to base of the cup. The foam is channelled from the foam conveyor (4) on to the disc and distance between the discharging end of the foam conveyor (10) and the rotating surface of the disc (9) is preferably less than 5 mm.

The container (1) is preferably provided with a grey water inlet port (11). After the process of eliminating surfactants from the grey water, the recovered purified water is preferably pumped using a water pump (12) through at least one filter (13) to further eliminate dissolved and suspended impurities. Alternatively this process to eliminate dissolved and suspended impurities can be achieved by a gravity driven process.

Figure 2:
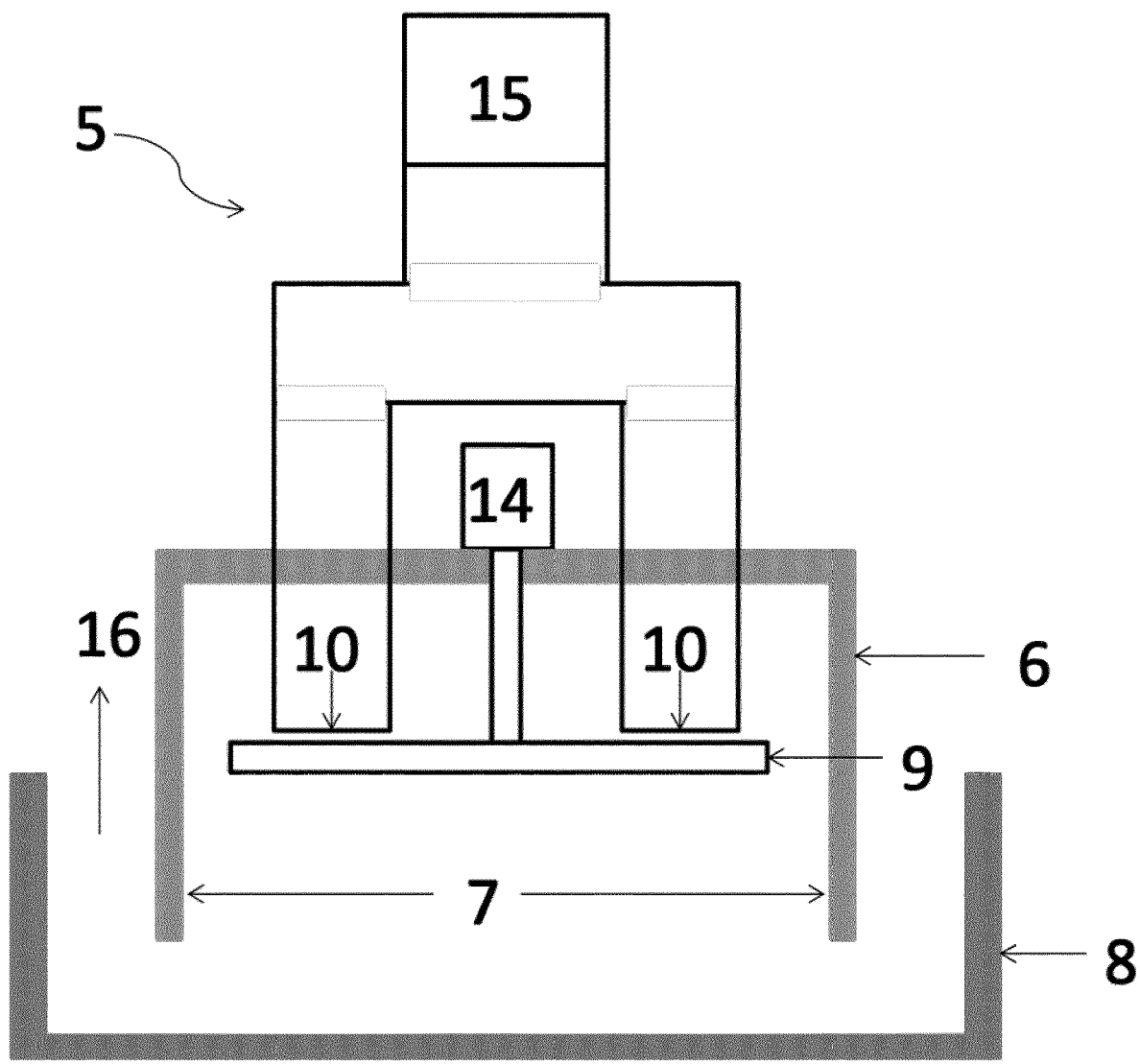
FIG. 2 is a perspective view of the foam breaking device.

FIG. 2 is a perspective view of the foam breaking device (5) that is placed outside the container (1). The foam breaking device (5) has an inverted cup (6) with open mouth of the cup (7) positioned over a collection tray (8). A disc (9) is connected to a motor (14) to facilitate rotation of the disc (9) at preferably a speed of 1000 rpm to 10000 rpm, is placed in the cup (6) and is rotatably connected to base of the cup (6). The foam is channelled from the foam conveyor (4) on to the disc (9) through the foam channel (15) and the distance between the discharging end of the foam conveyor (10) and rotating surface of the disc (9) is preferably less than 5 mm. The air will exit from the system through the gap provided for air exit (16).

The grey water taken in the airtight container (1) is sparged with air by the air pump (3a) and the surfactant in the grey water starts foaming and the foam starts collecting above the water in the container (1). The foam is then channeled on to the rotating disc (9) which aids in breaking the foam by shearing the foam cells and also clears the liquid resulting from the collapsed foam away from the disc (9) surface by centrifugal action. This liquid is restrained by the walls of the inverted cup (6). The liquid and also some froth from the cup (6) drains into the collection tray (8). The grey water in the container (1) is preferably purified further by passing it preferably through at least one filter (13).

Figure 3:
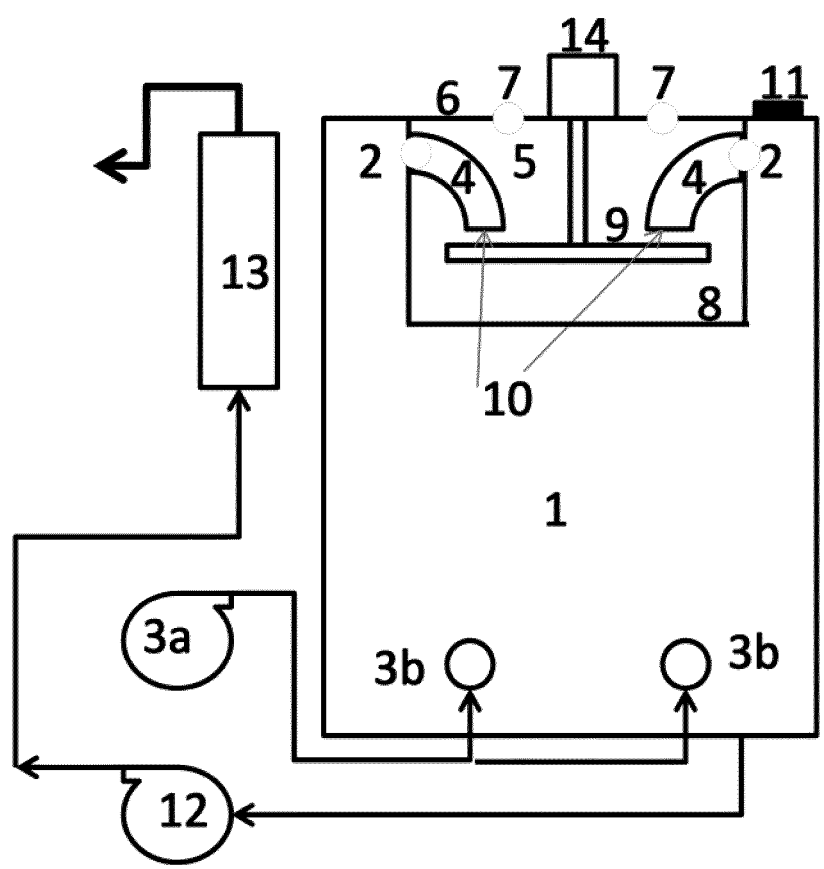
FIG. 3 is a perspective view of another embodiment of the device for in-home purification of grey water in accordance with the invention.

FIG. 3 is a perspective view of another embodiment of the device for in-home purification of grey water in accordance with the invention where the foam breaking device is accommodated at the top of the container to make the in-home purification of grey water more compact.

The air tight container (1) for holding grey water has the foam breaking device (5) fitted at the top of the container (1). The outlet port (2) aids in discharging out foam through the foam conveyor (4) on to the rotating disc (9). The container (1) has a means for aeration (3a) of the contents of the container (1) to which is attached a sparger (3b), which is capable of sparging air at a flow rate of 1-200 L/min into the grey water contained in the container (1).

The outlet port (2) of the container (1) is connected to a foam conveyor (4) which is in fluid communication with a foam breaking device (5) placed at the top part of the container (1). The foam breaking device (5) which has an inverted cup (6) is positioned over a collection tray (8) and the inverted cup is fixed to the collection tray and is provided with air vents (7). A disc (9) is connected to a motor (14) to facilitate rotation of the disc (9) at preferably a speed of 1000 rpm to 10000 rpm, is rotatably connected to the inverted cup (6) provided with air vents (7). The foam is channelled from the foam conveyor (4) on to the disc and distance between the discharging end of the foam conveyor (10) and the rotating surface of the disc (9) is preferably less than 5 mm.

The container (1) is preferably provided with a grey water inlet port (11). After the process of eliminating surfactants from the grey water, the recovered purified water is preferably pumped using a water pump (12) through at least one filter (13) to further eliminate dissolved and suspended impurities. Additional filters may be provided. Alternatively this process to eliminate dissolved and suspended impurities can be achieved by a gravity driven process.

The Container for Holding Grey Water

The container for holding grey water is preferably selected from any commercially available vessel with an air tight lid such as a bucket or a drum made of polymer or metal. For in-home use the capacity of the container is preferably in the range 10 litres to 200 litres and more preferably 20 litres to 50 litres. The outlet port is preferably provided at the top of the container and preferably above the level of the grey water in the container and more preferably on the air tight lid to which a foam conveyor is connected.

The foam conveyor is of any geometric cross section and preferably of a circular cross section. The foam conveying tube has preferably a diameter in the range of about 1 cm to the diameter of the vessel and more preferably in the range of 1 cm to 30 cm and still more preferably in the range of 3 to 15 cm. It is preferable to use more than one foam conveying tube for conveying the foam from the container.

The lid of the container is also preferably provided with an inlet port for introducing the grey water to be purified. The container is also preferably provided with a discharge port at the bottom for discharging purified water.

The ratio of grey water to air in the container is preferably in the range of 1:3 to 1:100 and more preferably in the range of 1:3 to 1:20.

Means for Aeration

The container is provided with a means for aerating the contents of the container. The aerating means is preferably selected from those used in the art such as a miniaturized compressor or air pump which is capable of providing air preferably at a flow rate of 1 litre to 200 litres per minute, which allows the air to form bubbles leading to the generation of stable foam. The air pump is preferably positioned outside the container but bubbles air into the grey water in the container, which may preferably be achieved by connecting a tube from the pump into the grey water. The end of the tube preferably has a sparger with preferably multiple pores. The pore size is preferably in the range of 1-1000 microns and more preferably 10-200 microns.

Foam Breaking Device

The foam breaking device is positioned external to the container and preferably is positioned at the top of the container to make the device more compact. The foam breaking device comprises an inverted cup with the open mouth of the cup positioned over a collection tray and a disc connected to a motor to facilitate rotation of the disc at preferably a speed varying in the range of 1000 rpm to 10000 rpm and more preferably in the range of 3000 rpm to 8000 rpm and more preferably 4000 rpm to 6000 rpm. The motor is preferably placed on the cup and rotatably connected to the base of the cup. The motor is of any type which is capable of producing the required rotation of the disc.

It is preferred that the inverted cup and the collection tray form a single unit with air vents provided in the unit to preferably ensure that a positive pressure in the range 1 to 1000 cm of water column is created in the foam breaking device. This positive pressure preferably enables that the foam breaking device is operated at foam flow rates in the range 1 to 200 L/min and preferably at a flow rate 2 to 50 L/min.

The foam conveyor connected to the outlet port of the container establishes fluid communication between the outlet port and the disc of the foam breaking device and distance between the discharging end of the foam conveyor and the rotating surface of the disc is preferably less than 5 mm and more preferably less than 2 mm. It is preferable to have more than one foam conveyor for discharging the foam from the container onto the disc. The discharging end of the foam conveyor preferably has at least two outlet ports so that the foam is preferably distributed on the disc as it gets discharged on the disc. The discharging end of the foam conveyor ends just above the rotating disc and the foam is preferably conveyed from the discharging end of the foam conveyor on to the disc.

It is preferred that the bulk of the grey water to be purified is below the foam in the container to preferably ensure that the water drains out from the foam under gravity to achieve relatively high pure water recovery. This is achieved by preferably minimizing the volume of the foam conveyors.

The disc is formed of a material selected from metals, polymers, ceramic etc. and preferably polymeric materials. The diameter of the disc varies preferably in the range from 5 cm to 30 cm and more preferably in the range of 10 cm to 20 cm. The surface of the disc that contacts the foam has preferably a roughened surface morphology. The surface preferably comprises elements with a dimension that is smaller than the median bubble size of the foam. The elements preferably have a dimension of between 0.01 and 3 millimetres, more preferably dimension of between 0.1 and 2 millimetres. The elements can for example be protrusions from the disk or material that is connected to the disc, e.g. sand or granular materials. The surface of the disc preferably comprises a pattern, and preferably the pattern is formed by or comprises concentric corrugations. The pattern can be formed by a concentric arrangement of roughness on the surface of the disc.

The rate of flow of the foam on to the disc is preferably 1 to 200 L/min and more preferably 2 to 50 L/min.

According to another aspect of the present invention there is provided a process for in-home purification of grey water using the device according to the invention comprising:

i. sparging air at a flow rate of 1-200 L/min into grey water to be purified contained in the airtight container;
ii. providing residence time of at least half a minute;
iii. channelling foam generated from the container onto the disc of the foam breaking device; and
iv. stopping the sparging of air after a time period of at least 1 minute to recover purified water.

The ratio of grey water to air in the container is preferably in the range of 1:3 to 1:100 and more preferably in the range of 1:3 to 1:20. It is preferred that ratio of the grey water to air in the container is at least 1:3.

In the above process after the process of eliminating surfactants from the grey water, it is preferable to pass the recovered purified water through at least one filter to further eliminate dissolved and suspended impurities. The recovered purified water is preferably pumped using a water pump through at least one filter to further eliminate dissolved and suspended impurities. The recovered purified water is preferably discharged outside the compartment before pumping the same through at least one filter to further eliminate dissolved and suspended impurities. Alternatively this process to eliminate dissolved and suspended impurities can be achieved by a gravity driven process.

In one aspect of the present invention the sparging of air is done at a flow rate in the range of 1-200 L/min and preferably at a flow rate in the range of 2-50 L/min.

In one aspect of the present invention the foam generated is channelled at a flow rate of 1 to 200 L/min and preferably at a flow rate 2 to 50 L/min.

Residence Time

Residence time is the time an average element of the foam spends in the container before exiting into the foam conveyor. It is the time elapsed from the generation of a typical foam cell upto the time when this foam cell exits the closed container. Residence time is calculated by the following formula.

$$\text{Residence time} = \text{Container head space volume} / \text{Air flow rate}$$

The residence time provided is preferably in the range 30 seconds to 60 minutes and more preferably 1 minute to 30 minutes. Preferably allowing the foam to drain in the container or providing residence time enables to preferably obtain substantially dry foam.

The recovered purified water is preferably passed through a filter comprising materials preferably selected from activated alumina, silica, diatomaceous earth, granular activated carbon, layered double hydroxides, powdered activated carbon, synthetic fibre/fabric media, filtration media based on polymeric fibres etc. and more preferably selected from materials such as synthetic fibres, activated carbon and layered double hydroxides.

In one aspect it was a surprising finding of the present invention that through the device and process of the invention, the surfactant concentration of the grey water was unexpectedly reduced from around 100 ppm-1000 ppm to below detection levels of less than 1 ppm.

EXAMPLES

Example 1: Effect of Surface Morphology of the Disc 10 litres of surfactant solution of 0.1 G/L was prepared by using technical grade of Sodium dodecyl benzene sulphonate obtained from Aldrich. The solution was poured into a plastic container of a capacity of about 50 Litres, provided with an air tight lid.

The surfactant solution was aerated at rate of 34.5 Litres per minute at standard temperature and pressure. The generated foam was conveyed through 7.5 cm diameter pipe and channelized to the foam breaking device, which consisted of a disk of diameter 12 cm, rotating at a speed of 6000 rpm. The experiments were conducted using two disc morphologies where one was a smooth disc and the other was a rough disk having concentric corrugations. The recovered purified water in the container and froth volumes exiting from foam breaking device were measured after 10 minutes of each experiment.

TABLE 1

Effect of morphology of disc on foam breaking performance

| Disk Type | Rough | Smooth |
|---|---|---|
| Water (mL) | 480 | 460 |
| Froth volume (mL) | 260 | 740 |
| Recovered purified water (L) | 9.5 | 9.5 |

The data presented in table 1 show that the disc having a rough morphology generated significantly less volume of froth as compared to a smooth disc thus making the system efficient and convenient. The foam breaking system ensures that the foam is effectively converted into a small liquid volume and post foam breakage, lower froth volume indicates the efficiency of the foam breaking system.

Example 2: Effect of the Speed of Rotation of the Disc

In order to study the effect of the speed of rotation, same procedure as in Example 1 was followed, except that the speed of rotation of the disc was varied by changing the current supplied to the motor. The amount of purified water recovered was measured and the results are presented in Table 2.

TABLE 2

Effect of the speed of rotation of the disc on foam breaking performance

| Average RPM | Froth volume (ml) | Recovered purified water (L) |
|---|---|---|
| 4500 | 1000 | 9.68 |
| 5600 | 220 | 9.77 |
| 6600 | 280 | 9.76 |

Data presented in Table 2 show that increasing the speed, decreases the volume of froth exiting from the foam breaking device and thus the volume of recovered purified water is high.

Example 3: Effect of the Ratio of Grey Water to Air in the Container

In order to study the effect of the ratio of grey water to air ratio in the container, same method was employed as in Example 1, except that experiments were carried out by varying the volume of the container or the air flow rate as indicated in Table 3.

TABLE 3

Effect of the ratio of grey water to air in container on foam breaking performance

| Parameter | 1 | 2 | 3 | 4 | 5 |
|---|---|---|---|---|---|
| Air flow rate L/min | 34.3 | 34.3 | 34.3 | 4.9 | 15.4 |
| Vessel volume (L) | 20 | 55 | 125 | 125 | 125 |
| Residence time (min) | 0.29 | 1.31 | 3.35 | 23.47 | 7.47 |
| Grey water:air | 1:2 | 1:4.5 | 1:11.5 | 1:11.5 | 1:11.5 |
| Recovered purified water (L) | 2 | 5.8 | 8.1 | 9.91 | 9.15 |

Data presented in Table 3 show that low grey water to air ratio resulted in more effective foam breaking performance as indicated by the volume of recovered purified water. The data also show that longer residence time improves the recovery of purified water.

Example 4: Efficiency of the Device in Purification of Grey Water

Grey water that had an initial surfactant concentration of about 110 ppm and turbidity of about 320 NTU, was purified using the device as shown in FIG. 1. The recovered purified water after removal of the foam was passed through two filters where one was a commercially available spun filter and the other was a filter made with granular activated carbon. After switching off the aeration of the grey water in the container, the recovered purified water in the container was pumped through the filters and it took about 10 minutes for further purification of 10 L of water. The data presented in Table 4 are the average of 10 experiments.

TABLE 4

Efficiency of the device in purification of grey water

| Surfactant concentration, ppm | | | Turbidity, NTU | | |
|---|---|---|---|---|---|
| Initial | Post aeration | Post filtration | Initial | Post aeration | Post filtration |
| 110 | 11 | 0.5 | 320 | 157 | 0.18 |

The results presented in Table 4 show that even without passing the recovered purified water through the filters the surfactant and turbidity levels were significantly reduced and the water could be used for several purposes and additionally passing the water through the filters, further purifies it and renders excellent quality water. When the grey water was passed through the filters without passing it through the device of the invention the filters choke and life of the filters was significantly compromised.

Example 5: % Recovery of Grey Water with the Air Flow Rate

The recovery of purified water was determined using higher level of the surfactant in the grey water using different air flow rates but keeping identical container volume, grey water to air ratios. The data are presented in Table 5.

TABLE 5

| Parameter | | | | | | | | | |
|---|---|---|---|---|---|---|---|---|---|
| Surfactant conc., ppm | 100 | 100 | 100 | 500 | 500 | 1000 | 1000 | 1000 | 1000 |
| Air flow rate, L/min | 15.4 | 7.5 | 4.9 | 7.5 | 2.2 | 15.4 | 5 | 3.5 | 2.2 |
| Vessel volume, L | 55 | 55 | 55 | 55 | 55 | 55 | 55 | 55 | 55 |
| Grey water:air | 1:4.5 | 1:4.5 | 1:4.5 | 1:4.5 | 1:4.5 | 1:4.5 | 1:4.5 | 1:4.5 | 1:4.5 |
| Residence time, min | 2.9 | 6 | 9.2 | 6 | 20.5 | 2.9 | 9 | 12.9 | 20.5 |
| Recovery, % | 91.5 | 97 | 99.7 | 66 | 99.8 | 26 | 78 | 93.7 | 98.7 |

Data presented in Table 5 show that longer residence time resulted in significantly more effective foam breaking performance as indicated by the volume of recovered purified water especially when the surfactant level in the grey water was high.

The invention claimed is:

1. A device for purification of grey water, the device comprising:
   i. an air tight container for holding grey water comprising an outlet port for discharging out foam;
   ii. the container comprising a means for aeration of contents of the container;
   iii. a foam conveyor connected to the outlet port; and
   iv. a foam breaking device;
   wherein the outlet port is in fluid communication with a foam breaking device comprising:
   a. an inverted cup;
   b. a collection tray; and
   c. a disc connected to a motor to facilitate rotation of the disc;
   wherein the foam conveyor establishes fluid communication between the outlet port and the disc of the foam breaking device; and
   wherein;
      either the foam breaking device is placed external to the container and is such that the inverted cup has an open mouth which is positioned in the collection tray, the disc being placed in the inverted cup and rotatably connected to a base of the inverted cup;
      or the inverted cup is positioned over the collection tray and fixed to the collection tray and is provided with an air vent, the disc being placed above the collection tray and rotatably connected to the inverted cup;
      a surface of the disc is rough and has concentric corrugations.

2. A device according to claim 1, wherein a distance between a discharging end of the foam conveyor and the surface is less than 5 mm.

3. A device according to claim 1, wherein a rotation speed of the disc is in the range 1000 rpm to 10000 rpm.

4. A device according to claim 1, wherein the outlet port is above a grey water level.

5. A device according to claim 1, wherein the outlet port is at a top of the container.

6. A device according to claim 1, wherein the means for aeration is connected to a sparger placed under the grey water in the air tight container.

7. A process for purification of grey water using the device according to claim 1, the process comprising:
   i. sparging air at a flow rate of 1-200 L/min into grey water to be purified contained in the container;
   ii. providing a residence time of at least half a minute;
   iii. channeling foam generated from the container onto the disc; and
   iv. stopping the sparging of air after a time period of at least 1 minute to recover purified water.

8. A process according to claim 7, wherein a ratio of grey water to air in the container is in the range of 1:3 to 1:100.

9. A process according to claim 8, wherein a ratio of grey water to air in the container is in the range of 1:3 to 1:20.

10. A process according to claim 7, wherein the recovered purified water is passed through at least one filter.

11. A process according to claim 10, wherein the recovered purified water is discharged outside the container before passing the same through a filter.

12. A device comprising:
    a container comprising an outlet port configured to discharge foam;
    an air pump configured to be fluidly coupled to the container;
    a pipe configured to be fluidly coupled to the outlet port and comprising a discharge end; and
    a foam breaking device configured to be positioned externally from the container and fluidly coupled to the pipe, the foam breaking device comprising:
       a cup having an opening;
       a disc configured to be positioned proximate the discharge end and within the cup; and
       a motor configured to be operably coupled to the disc and facilitate rotation of the disc.

13. The device of claim 12, further comprising a collection tray, the collection tray configured to be positioned below the cup.

14. The device of claim 12, wherein:
    the pipe has an outlet end configured to be coupled to the outlet port, the outlet end opposite the discharge end; and
    the disc is configured to be positioned within the cub and proximate the discharge end, and configured to be rotatably coupled to the cup, when the disc is coupled to the motor and the pipe is coupled to the container.

15. The device of claim 14, wherein a distance between the discharge end and the disc is less than 5 mm.

16. The device of claim 12, further comprising a sparger configured to be fluidly coupled to the air pump and positioned within the container.

17. A device comprising:
    a container comprising an outlet port configured to discharge foam;
    an air pump configured to be in fluid communication with the container;
    a pipe configured to be fluidly coupled to the outlet port; and a foam breaking device configured to be coupled to a top of the container and in fluid communication with the pipe, the foam breaking device comprising:
- a collection tray configured to be coupled to the container;
- a cup configured to be positioned over and coupled to the collection tray, the cup having an air vent;
- a disc configured to be rotatably coupled to the cup; and
- a motor configured to be operably coupled to the disc and facilitate rotation of the disc.

18. The device of claim 17, wherein:
the pipe comprises an outlet end configured to be coupled to the container and a discharge end opposite the outlet end; and
the disc is positioned below the discharge end when the disc is operably coupled to the motor, the motor configured to rotate the disc to shear the foam received from the discharge end.

19. The device of claim 17, further comprising a sparger fluidly coupled to the air pump and positioned within the container;
wherein the container is air tight.

20. The device of claim 17, wherein:
the pipe comprises an outlet end configured to be coupled to the container and a discharge end opposite the outlet end; and
the disc is positioned proximate the discharge end when the disc is operably coupled to the motor, the disc comprising a rough surface configured to spin and shear foam bubbles received from the discharge end.

* * * * *